United States Patent [19]

Kim

[11] Patent Number: 4,829,796
[45] Date of Patent: May 16, 1989

[54] APPARATUS FOR KEEPING A SPARE CAR KEY IN A FUEL TANK CAP

[76] Inventor: Jung Wook Kim, 9-13 Shibum Apt. 50, Yoeuido-dong, Yungdeungpo-ku, Seoul, Rep. of Korea

[21] Appl. No.: 46,531

[22] Filed: May 6, 1987

[30] Foreign Application Priority Data

May 15, 1986 [KR] Rep. of Korea .............. 86 UM 6757

[51] Int. Cl.$^4$ ............................................. B65D 55/14
[52] U.S. Cl. ......................................... 70/168; 70/63; 70/312
[58] Field of Search .................. 70/312, 315, 316, 317, 70/310, 333 A, 158, 163-173, 63

[56] References Cited

U.S. PATENT DOCUMENTS

| | | | |
|---|---|---|---|
| 3,677,042 | 7/1972 | Atkinson | 70/70 |
| 3,800,571 | 4/1974 | Heine | 70/71 |
| 3,820,363 | 6/1974 | Bako | 70/312 |
| 4,354,367 | 10/1982 | Wahl | 70/333 A |
| 4,467,628 | 8/1984 | Zampini | 70/312 |

Primary Examiner—Robert L. Wolfe
Attorney, Agent, or Firm—Holman & Stern

[57] ABSTRACT

This invention relates to an apparatus for keeping a spare key in the car. Only when the numbers of the revolving rings are set to the predetermined numbers, a spare key can be taken out because the cap of the apparatus is released from an inlet of the fuel tank. Although a driver has lost his car key or locks the door with his key being left in the car or he does not have a key, he can drive his car by utilization of a spare key which is installed under the fuel tank cap. In case his secret number for the spare key is known to others, he can easily change the number to a new number. And accordingly, although the number for his spare key is disclosed to others, an immediate change of the number prevents his car from being stolen.

6 Claims, 5 Drawing Sheets

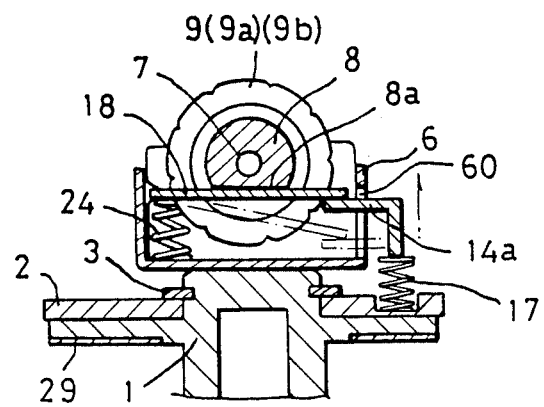
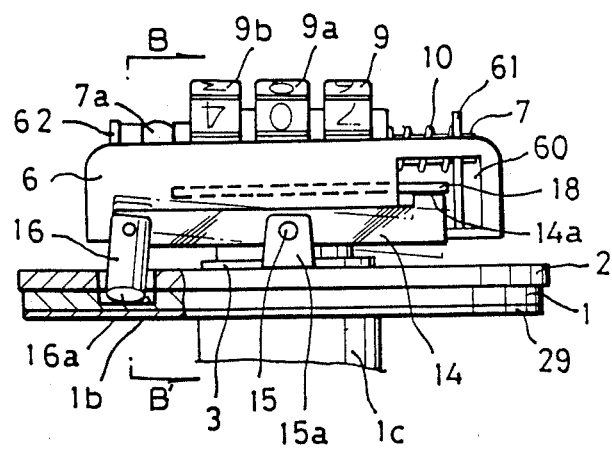
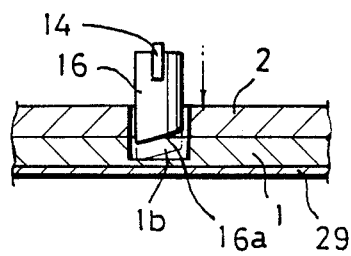

APPARATUS FOR KEEPING A SPARE CAR KEY IN A FUEL TANK CAP

BACKGROUND OF THE INVENTION

This invention relates to an apparatus for keeping a spare key by the use of a fuel tank cap.

Generally, most cars have no apparatus for keeping a spare key in the cars. In case a driver lost his key, or locked the door with his key being left in the car, or he does not have a key with him, and he has to go to his office or home to bring a spare key. It is very cumbersome and time—consuming. Further, if a fuel tank cap is not tightly closed, the fuel will leak out. Therefore, this invention is to provide an apparatus for keeping a spare key in a car and also for closing a fuel tank cap firmly.

SUMMARY OF THE INVENTION

This invention provides an apparatus for keeping a spare key. The apparatus lies under a fuel tank cap and is made by using a screw. Some parts of revolving rings are exposed over a cap of the apparatus.

The cap is released from an inlet for a fuel only when the numbers on the rings are set to the predetermined numbers. In case a driver lost his key, he doesn't have to consume time to get another key. The invention will be further described with reference to the accompanying drawings, wherein:

BRIEF DESCRIPTION OF THE DRAWING

FIG. 8 is a front elevational view showing a bar which goes up when the numbers on the rings are set to the predetermined numbers;

FIG. 9 is a front elevational view showing the operation of a bar;

FIG. 10 is a sectional view taken along line of the FIG. 9 showing the operation of the rod.

DETAILED DESCRIPTION

Figure 1:
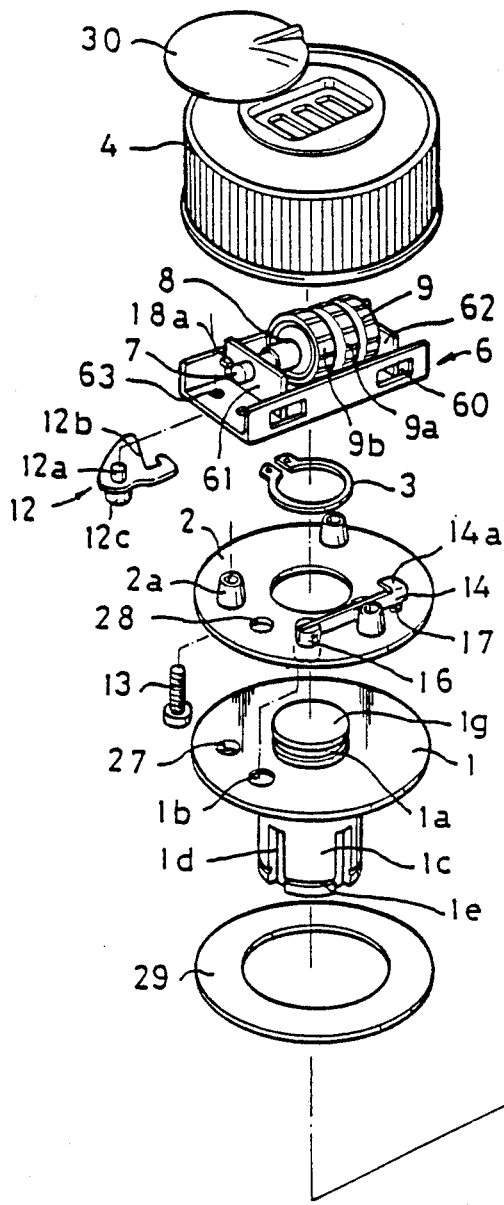
FIG. 1 is an exploded perspective view of an essential part of the apparatus embodying the invention.
Figure 1:
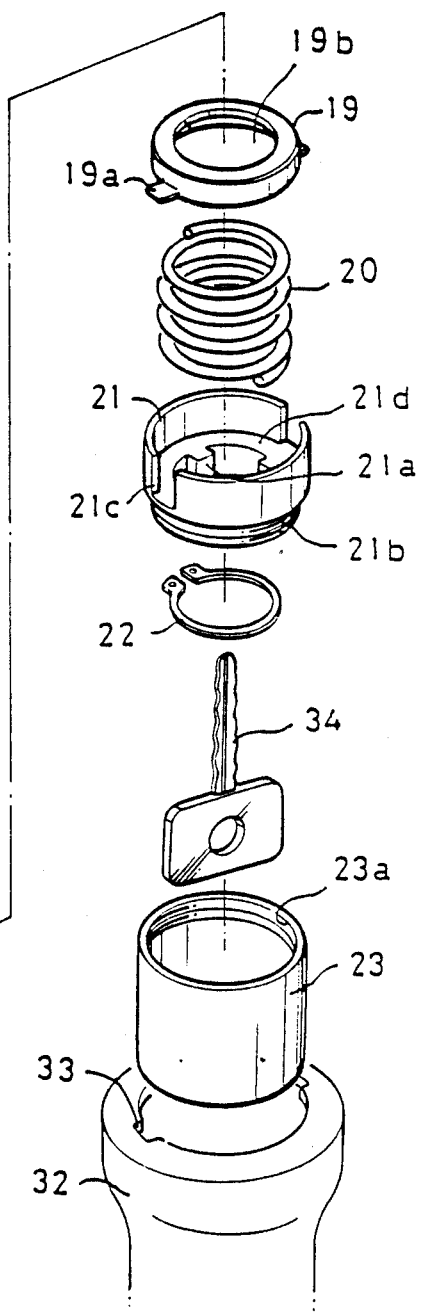
Figure 2:
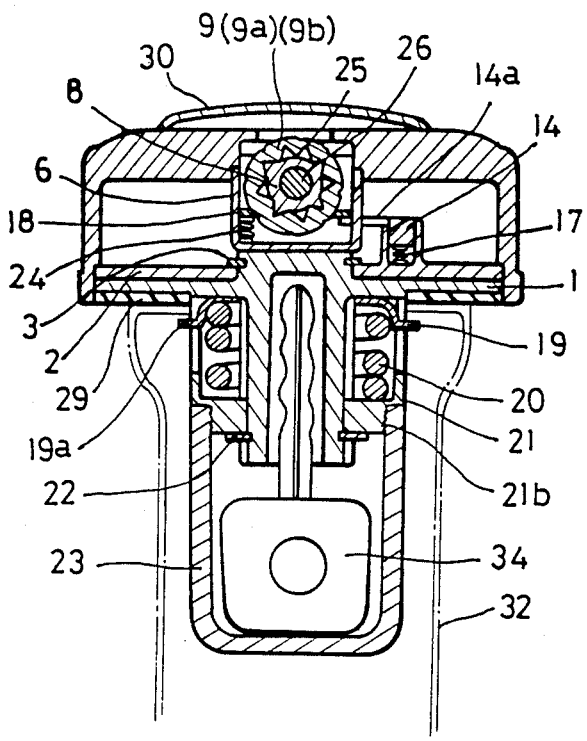
FIG. 2 is a vertical sectional view of the apparatus constructed in accordance with the invention.
Figure 3:
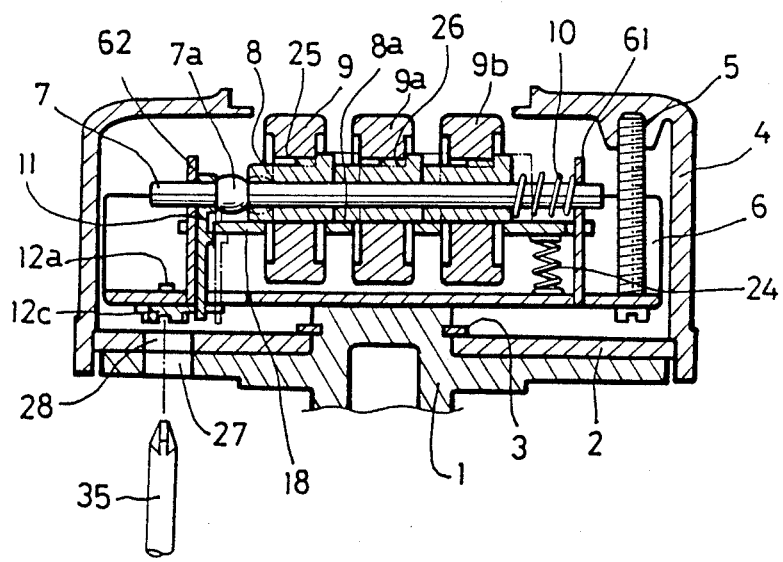
FIG. 3 is a vertical sectional view particularly showing the assembly of revolving rings.
Figure 4:
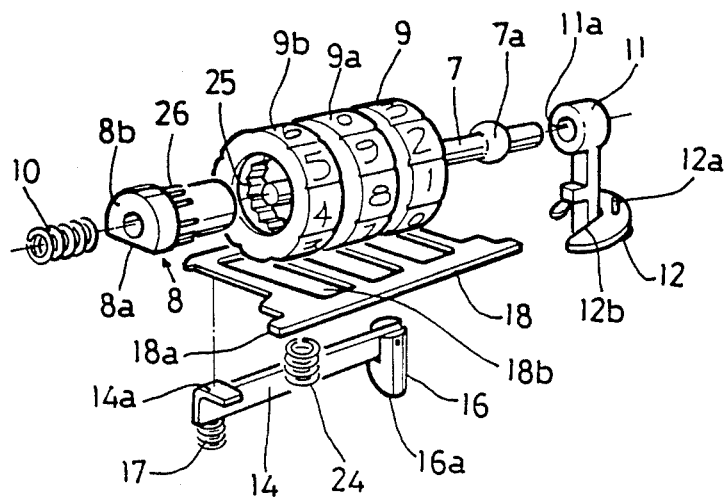
FIG. 4 is an exploded perspective view of a fixed body.
Figure 5:
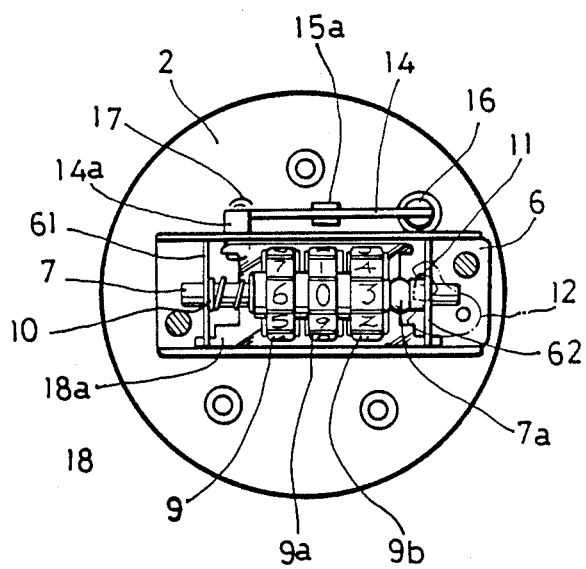
FIG. 5 is a plan view of the fixed body.

In the drawings, a downwardly extending cylinder 1c and an upwardly extending cylinder 1g are integral with a central portion of a circular, fixed plate 1. A revolving plate 2 having an axial hole for receiving the upwardly extending cylinder 1g is rotatably mounted on the fixed plate 1.

Four longitudinal grooves 1d are provided around the exterior of the downwardly extending cylinder 1c, the grooves being disposed relatively high up in the exterior of the cylinder 1c. A horizontal groove 1e is also provided around the exterior of the lower part of the cylinder 1c. The cylinder 1c also has a central longitudinal through hole. The circular fixed plate 1 has a non-central hole 1b. The upwardly extending cylinder 1g is provided with a peripheral groove 1a for receiving a snap ring 3 so that the revolving plate 2 is easily rotated while not being separated from the fixed plate 1g.

The revolving plate 2 is provided with a means which is shaped like a seesaw. The means comprises a horizontal bar 14, a pair of longitudinal supports 15a, 15a and a downwardly extending rod 16. The supports 15a, 15a that are on opposite sides are approximately intermediate the bar 14. The bar 14 has a central slot which first over a pin 15 which is inserted from the outside surface of one support to the outside surface of the other support, whereby the bar 14 is movable up and down without connecting to the supports 15a, 15a. The upper part of the rod 16 is split into two portions and therebetween one end of the bar 14 is placed. The bar 14 has a slot at one end (not shown) which first over a pin which is inserted between the outside surfaces of the two split portions. The other end of the bar 14 has a horizontally bent portion 14a. A spring is mounted beneath the portion 14a.

A fixed body 6 comprises a pair of brackets 61, 62, a fixed shaft 7, a plate 18, revolving rings 9, 9a and 9b and a spring 10. The lower edges of the brackets 61, 62 have downwardly protruding portions to be respectively inserted into a pair of laterally spaced slots which are formed at the bottom of the body 6. Controllers 8 have cylindrical segments—shaped portions 8b and triangular—formed protrusions 26. The protrusions 26 are engaged with the triangular-formed grooves 25 of the revolving rings 9, 9a and 9b.

The controllers 8 are rotatably mounted around the shaft 7 and the rings 9, 9a and 9b are rotatably mounted around the controllers 8. The revolving rings have the numbers around their exteriors. A means 11 is put between a protruding portion 7a of the shaft 7 and a bracket 61. At the other end of the shaft a spring 10 is mounted between the other bracket 62 and one of the controllers 8.

A plate 18 has three laterally spaced oblong holes 18b for receiving part of the outer surface of the revolving rings 9, 9a and 9b. The brackets 61, 62 are located vertically within open side walls of the body 6. Horizontally protruding portions 18a, 18a of the plate 18 are inserted in slots of the upstanding brackets 61, 62. Horizontally protruding portions on both sides of the brackets 61, 62 are inserted slots which are displaced relatively high up in the side walls of the body 6. Laterally spaced oblong holes 60, 60 are formed in one side wall of the body 6, the side wall not being adjacent to the protruding portions of the brackets. The lower end of the control means 11 is exposed downwardly from the lower surface of the fixed body.

A hooked control plate 12 has a hole (not shown) for receiving a pin 12a and they are bonded together so that the hooked control plate 12 may turn on the axis of the pin 12a mounted in holes 63 of fixed body 6 within a given angle. The inner surface 12b of the hooked control plate 12 is moved around the protruding lower end of the control means 11 within a given angle. The control plate 12 has a downwardly extending portion 12c having a groove at the bottom for receiving a driver and the like.

The body 6 has holes at the bottom. A cap 4 has bosses having tapped holes and depending from the inside thereof. Bolts 5 are used for holding the body 6 and the cap 4 together. The cap 4 also has other bosses having tapped holes 36 and depending from the inside thereof. The revolving plate 2 has bosses 2a having through holes on the upper surface thereof. Bolts 13 are used for holding the revolving plate 2 and the cap 4 together.

The horizontally bent portion 14a of a bar 14 contacts with the lower surface of the plate 18 through the oblong hole 60.

The revolving rod 16 rotates with the revolving plate 2. When the rod meets the hole 1b of the fixed plate 1, it projects downwardly through a hole 1b by the pressure of the spring 17, the hole 1b having the closed bottom.

A packing 29, a cap 19, a compression spring 20 and a supporting member 21 are assembled around the exterior of the cylinder 1c in turn, and thereafter a snap ring 22 is inserted into the groove 1e.

The supporting member 21 comprises a sill 21d around its inner wall and protrusions 21a around the inner wall of the sill 21d. A spring 20 is mounted on the sill 21d and the protrusions 21a are engaged with the grooves 1d of the cylinder 1c. The cap 19 is shaped like a ring. When the supporting member is shaped like a ring. When the supporting member 21 is pushed toward the fixed plate 1, the cap 19 is put over the sill 21d, the protrusions 19a or ring 19, 19a project outwardly from open holes 21c, 21c, and the groove 1e is exposed and engaged with the snap ring 22.

The protrusions 19a are inserted into the recesses 33 formed on the upper part of the inner wall of the inlet of the fuel tank by the pressure of the spring 20. This causes the protrusions 19a to move only when predetermined numbers of the dials are set in turning the cap 4. The exterior of the lower part 21b of the supporting member 21 is screwed to the interior of the upper part 23a of the cylinder for a key 23.

When all members mentioned above are assembled and the fixed plate 1 is pressed down and turned, the protrusions 19a descend from the recesses 33, whereby the inlet 32 of the fuel tank is shut by the fixed plate 1. The fixed plate 1 and the revolving plate 2 are turned simultaneously when the cap 4 is turned because the cap 4, the body 6 and the revolving plate 2 are connected in turn by bolts 5 and 13, and the revolving plate 2 is rotatably mounted around the upwardly extending plate 1g with the snap ring 3.

The body 6 comprising the revolving rings 9, 9a and 9b having the numbers, the plate 18 having laterally spaced holes 18b, the brackets 61, 62, the side walls to support the brackets, and the oblong holes 60 to which the horizontally bent portion 14a are inserted enables the bar 14 and the rod 16 to be operated.

When the numbers on the revolving rings 9, 9a and 9b are not to the predetermined numbers, a round-shaped surface of the segment of a cylinder—shaped portion 8b contact with the upper surface of the plate 8 and the plate 18 presses down the bent portion 14a whereby the rod 16 goes upward as shown by the solid line in FIG. 10. The rod 16 has two different sides different in length due to a slant 16a at its bottom. The FIG. 10 shows that the end of the longer side of the rod goes down a a little from the top of the hole 1b, and the shorter side of the rod is displaced a little high in the hole. If the revolving plate 2 is rotated toward the shorter side of the rod 16 (that is, in the direction of closing the cap 4), the rod 16 is gradually pulled out from the hole 1b and will be rotated. However, the revolving plate 2 can not be moved toward the longer side of the rod 16 (that is, in the direction of opening the cap 4), because the longer side is caught in the hole 1b. Although the numbers on the revolving rings 9, 9a and 9b are not to the predetermined number, the cap 4 can be closed because the revolving plate 2 will be turned together with the cap 4 with the fixed plate 1 being fixed. However, for the cap 4 to open, the numbers on the rings 9, 9a and 9b should be to the predetermined numbers because the fixed plate 1 should turn together with the revolving plate 2 and the cap 4. When the numbers on the rings 9, 9a and 9b are to the predetermined numbers for the cap 4 to open, the controllers will move simultaneously so that the flat surface 8a contacts with the upper surface of the plate 18. Thereafter, the plate 18 goes upward by the pressure of a spring 24 under the plate 18 and contacts with the flat surface 8a whereby the cap 4 can open.

The revolving rings 9, 9a and 9b have a width of twice as long as the triangular-formed protrusions 26. The spring 10 interposed between the controllers 8 and the bracket 62 causes the controllers 8 to be pushed toward the control means 11.

If a user turns the rings 9, 9a and 9b for setting the numbers on the rings the predetermined numbers, the controllers 8 move simultaneously because the triangular-formed protrusions 26 are engaged with the triangular-formed grooves 25, and the horizontally bent portion 14a goes upward together with the plate 18 by the pressure of the spring 17. And accordingly, the rod 16 on the opposite side of the bent portion 14a goes downward, the shorter side of the rod 16 being caught in the hole 1b, when the cap 4 with the revolving plate 2 and the fixed plate 1 moves together. At the time when the protrusions 19a, 19a are inserted into the recesses 33 during turning of the cap 4, a user may raise the cap 4 and remove a key 34 out of the cylinder 23 for a key.

If a user wants his numbers to be changed, after he has set the dial to the numbers he has used, he may turn the control plate 12 by inserting a driver 35 and the like in the groove at the bottom of the cylinder 12c through aligned holes 27 and 28 formed on the fixed plate 1 and the revolving plate 2 respectively, whereby the inner surface 12b of the control plate 12 will push the protruding end of the control means 11 toward the spring 10. Thereafter, the protruding portion 7a of the shaft 7 will push the controller 8, whereby the triangular-formed protrusions 26 are released from the triangular-formed grooves 25 and then, the revolving rings 9, 9a and 9b will be separated from the controller 8, and rotated freely. Then the user can set the numbers of the dial to his new numbers. In such a condition, the flat surfaces 8a of the controllers 8 remain in contact with the upper surface of the plate 18. When finishing said operation, the user will return the hooked control plate 12 to its original condition and accordingly, the controllers 8, the shaft 7 and the control means 11 will be returned to their original condition by the pressure of the spring. And the revolving rings 9, 9a and 9b will move together with the controllers 8 because the triangular-formed protrusions 26 are reengaged with the triangular-formed grooves 25. Then, the user can use the apparatus constructed in accordance with the invention with his new numbers.

The through hole 28 into which the driver and the like 35 will be inserted is also for turning the bolt 13 which will connect the revolving plate 2 to the cap 4. The protecting cover 30 is rotatably mounted on the upper part of the cap 4 by a pin 31 to cover the upwardly extending numbers of the revolving rings. That is, it is possible to close the inlet of the fuel tank regardless of whether the predetermined numbers are set after the inlet of the fuel tank is opened.

Figure 6:
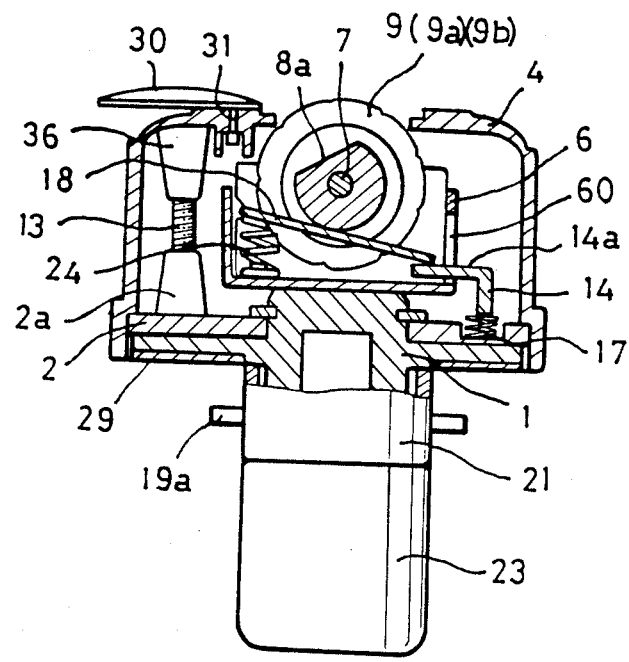
FIG. 6 is a sectional view taken along line A—A' of the FIG. 7.
Figure 7:
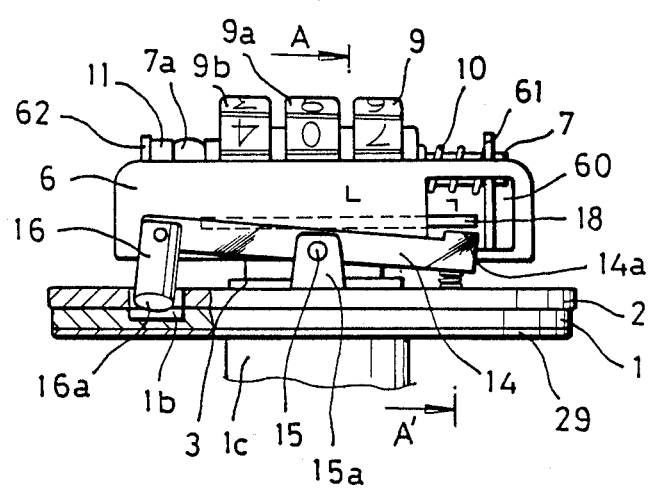
FIG. 7 is a front elevational view showing the operation of a rod.

The closed fixed plate can not be released from the inlet of the fuel tank by other numbers than the predetermined ones being set. Because the round-shaped part 8b of the controllers 8 contacts the upper surface of the plate 18 as shown in FIG. 6, whereby the plate 18 presses down the protrusion 14a of the bar 14 and accordingly, the rod 14 goes upward. In such a condition, it is possible for the rod 16 to move toward its shorter side but impossible to move toward its longer side so the fixed plate 1 will not move and accordingly the cap 4 can not be released from the inlet of the fuel tank 32. That is, only when the numbers of the rings 9, 9a and 9b coincide with the predetermined numbers will the cap be released from the inlet of the fuel tank and a user will be able to take out a spare key.

What is claimed is:

1. An apparatus for keeping a spare car key in a fuel tank cap, comprising a cap provided on a lower surface thereof with downwardly protruding portions;

a fixed body disposed under the cap, the fixed body having a pair of upstanding brackets with a fixed shaft therebetween, said fixed shaft carrying rotatably thereon plural axially disposed controllers each having a cylindrical segment shaped portion and triangular-shaped protrusions, a revolving ring being carried axially displaced on each said controller, each said revolving ring having triangular-shaped grooves formed in an inner wall thereof and having numbers around an exterior wall thereof, said fixed shaft having a protruding shaft portion formed at one end thereof, a spring being place around another end of the fixed shaft between one of said brackets and one of said controllers, a plate provided with holes therein for receiving lower portions of said revolving rings being provided under said fixed shaft, said plate having protruding portions inserted in slots of said brackets and jointing said plate therebetween, said plate being biased by a spring towards said fixed shaft, a control means being carried on the one end of the fixed shaft between the protruding shaft portion and one of said brackets, said control means being actuatable for axially displacing said fixed shaft for axially displacing said controllers thereon relative to said revolving rings;

a revolving plate mounted to the underside of said cap and rotatable therewith, said fixed body being disposed between said cap and said revolving plate, said revolving plate having a central hole therein;

a hooked control plate having a hooked portion and rotatably carried on an underside of said fixed body, said hooked control plate having a groove in a bottom thereof for receiving a screwdriver therein, said hooked control plate being movable for engaging a lower portion of said control means;

a fixed plate having an upwardly extending cylindrical portion and a downwardly extending cylindrical portion, said revolving plate being mounted rotatably on said upwardly extending cylindrical portion of said fixed plate;

a bar pivotably mounted on said revolving plate, said bar having a rod at one end thereof which rod has a slanting lower end, another end of said bar having a horizontally extending portion engageable by said plate of said fixed body, the lower end of said rod being inserted through a hole in said revolving plate and being insertable in a corresponding hole in said fixed plate, whereby in a first position of said bar the lower end of said rod protrudes into the hole in said fixed plate for preventing rotation of said revolving plate relative said fixed plate, and in a second position of said bar the lower end of said rod clears said hole in said fixed plate for permitting rotation of said revolving plate relative said fixed plate; and a ring-shaped cap member carried on the downwardly extending cylindrical portion of the fixed plate and having outwardly protruding portions for engaging a fuel tank filler neck.

2. An apparatus according to claim 1 wherein said controllers are connected to an inner wall of said revolving rings by engaging said triangular-shaped protrusions with said triangular-shaped grooves, the length of said triangular-shaped protrusions being approximately half the width of the revolving rings.

3. An apparatus according to claim 1 wherein an upper part of said control means is displaceable between one of said brackets and said protruding portion of said fixed shaft, said control means having a downwardly extending portion arranged for being movably contacted by an inner side of said hooked control plate, said hooked control plate being movably mounted by a pin on said fixed body.

4. An apparatus according to claim 1 wherein a spring is placed beneath said horizontally extending portion of said bar the bottom of said hole in said fixed plate being closed.

5. An apparatus according to claim 1 wherein said bar has a central hole for receiving a pin for being pivoted up and down, and said horizontally extending portion of said bar always contacts with a lower surface of said plate in the fixed body through an oblong hole formed in a side wall of said fixed body.

6. An apparatus according to claim 1 wherein when the numbers of said revolving rings are set to predetermined numbers, flat surfaces of said controllers contact an upper surface of said plate of said fixed body and said horizontally extending portion of said bar goes up, whereby the end of said rod is inserted into the hole in said fixed plate.

* * * * *